(12) United States Patent
Resnick Kossnick

(10) Patent No.: US 11,263,658 B1
(45) Date of Patent: Mar. 1, 2022

(54) NON-PROMOTION CONTENT DETERMINATION SYSTEM

(71) Applicant: Groupon, Inc., Chicago, IL (US)

(72) Inventor: Rebecca Abigail Resnick Kossnick, Palo Alto, CA (US)

(73) Assignee: Groupon, Inc., Chicago, IL (US)

( * ) Notice: Subject to any disclaimer, the term of this patent is extended or adjusted under 35 U.S.C. 154(b) by 597 days.

(21) Appl. No.: 14/301,034

(22) Filed: Jun. 10, 2014

Related U.S. Application Data

(60) Provisional application No. 61/835,148, filed on Jun. 14, 2013.

(51) Int. Cl.
*G06Q 30/00* (2012.01)
*G06Q 30/02* (2012.01)

(52) U.S. Cl.
CPC ................ *G06Q 30/0242* (2013.01)

(58) Field of Classification Search
CPC .......... G06Q 30/0242; G06Q 30/0244; G06Q 30/0254; G06Q 30/0276
See application file for complete search history.

(56) References Cited

U.S. PATENT DOCUMENTS

| | | | | |
|---|---|---|---|---|
| 2004/0204983 A1* | 10/2004 | Shen | ...................... | G06Q 10/10 705/14.43 |
| 2005/0159921 A1* | 7/2005 | Louviere | ................ | G06Q 30/02 702/181 |
| 2008/0092182 A1* | 4/2008 | Conant | .............. | H04N 7/17318 725/109 |
| 2008/0140508 A1* | 6/2008 | Anand | .................... | G06Q 30/02 705/14.43 |
| 2009/0106070 A1* | 4/2009 | Konar | .................... | G06Q 30/02 705/14.41 |
| 2009/0187939 A1* | 7/2009 | Lajoie | .................... | G06Q 30/02 725/34 |
| 2009/0248513 A1* | 10/2009 | Aggarwal | .............. | G06Q 30/02 705/14.72 |
| 2010/0076822 A1* | 3/2010 | Steelberg | ................ | G06Q 30/02 705/14.41 |
| 2010/0100545 A1* | 4/2010 | Jeavons | ................. | G06Q 30/02 707/738 |
| 2010/0114719 A1* | 5/2010 | Steelberg | ........... | G06Q 30/0276 705/14.72 |
| 2011/0282727 A1* | 11/2011 | Phan | ...................... | G06Q 10/10 705/14.36 |
| 2012/0158494 A1* | 6/2012 | Reis | .................... | G06Q 30/0255 705/14.49 |
| 2012/0330735 A1* | 12/2012 | Gasparine | .............. | G06Q 30/02 705/14.16 |

* cited by examiner

*Primary Examiner* — Ilana L Spar
*Assistant Examiner* — Allan J Woodworth, II
(74) *Attorney, Agent, or Firm* — Alston & Bird LLP

(57) ABSTRACT

Systems and methods are presented for determining non-promotion content to include in an electronic promotion correspondence sent to a consumer. A promotion program offering system may access a set of promotions generated for a target consumer and determine the effect of presenting non-promotion content with one or more of the promotions. The promotion program offering system may determine selected promotions and/or non-promotion content to include in the electronic promotion correspondence according to any number of criteria, e.g., to maximize the probability the target consumer purchases one or more promotions in the electronic promotion correspondence.

17 Claims, 7 Drawing Sheets

NON-PROMOTION CONTENT DETERMINATION SYSTEM

CROSS-REFERENCE TO RELATED APPLICATIONS

This application claims the benefit of U.S. Provisional Application No. 61/835,148, entitled "NON-PROMOTION CONTENT DETERMINATION SYSTEM," and filed Jun. 14, 2013, the entire contents of which are hereby incorporated by reference.

FIELD

The present description relates to offering promotions associated with a product or a service. This description also relates to determining non-promotion content to include in electronic promotion correspondence sent to a consumer.

BACKGROUND

Merchants typically offer promotions to consumers from time to time in order to generate more business. The promotions offered may be in the form of discounts, deals, rewards or the like. Often times, a promotion, or a number of promotions, may be presented to a consumer in the form of an electronic correspondence. It may be difficult to determine the content to include in electronic correspondence to present to the consumer.

SUMMARY

Systems and methods for determining non-promotion content to include in electronic promotion correspondence are disclosed.

In a first aspect, a system includes a memory storing a set of promotions generated for a target consumer and a set of non-promotion content. The system also includes non-promotion content logic in communication with the memory and configured to access the set of promotions; access the set of non-promotion content; determine the effect of presenting one or more of the non-promotion content with promotions from among the set of promotions; determine at least one selected promotion from among the set of promotions and at least one selected non-promotion content from among the set of non-promotion content to include in an electronic promotion correspondence to send to the target consumer; generate the electronic promotion correspondence that includes the at least one selected promotion and the at least one selected non-promotion content; and send the electronic promotion correspondence to the target consumer.

In another aspect, a method includes the steps of accessing an input electronic promotion correspondence generated for a target consumer, where the input electronic promotion correspondence comprises one or more promotions; accessing a non-promotion content; determining whether to alter the input electronic promotion correspondence to include the non-promotion content. When it is determined to alter the input electronic promotion correspondence to include the non-promotion content, the method includes obtaining an output electronic promotion correspondence by altering the electronic promotion correspondence to include the non-promotion content; and sending the output electronic promotion correspondence to the target consumer. When it is determined not to alter the input electronic promotion correspondence to include the non-promotion content, the method includes sending the input electronic promotion correspondence to the target consumer.

In yet another aspect, a method includes accessing a set of promotions generated for a consumer, where the set of promotions includes a first promotion; accessing a first non-promotion content; determining an effect of presenting the first non-promotion content with the first promotion in an electronic promotion correspondence for the consumer; determining whether to include the first non-promotion content, the first promotion, or both, in the electronic promotion correspondence for the consumer based, at least in part, on the effect of presenting the first non-promotion content with the first promotion in an electronic promotion correspondence.

Other systems, methods, and features will be, or will become apparent to one with skill in the art upon examination of the following figures and detailed description. It is intended that all such additional systems, methods, and features included within this description, be within the scope of the disclosure, and be protected by the following claims.

BRIEF DESCRIPTION OF THE SEVERAL VIEWS OF THE DRAWING(S)

The present invention may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

The present invention as described herein may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

Figure 1:
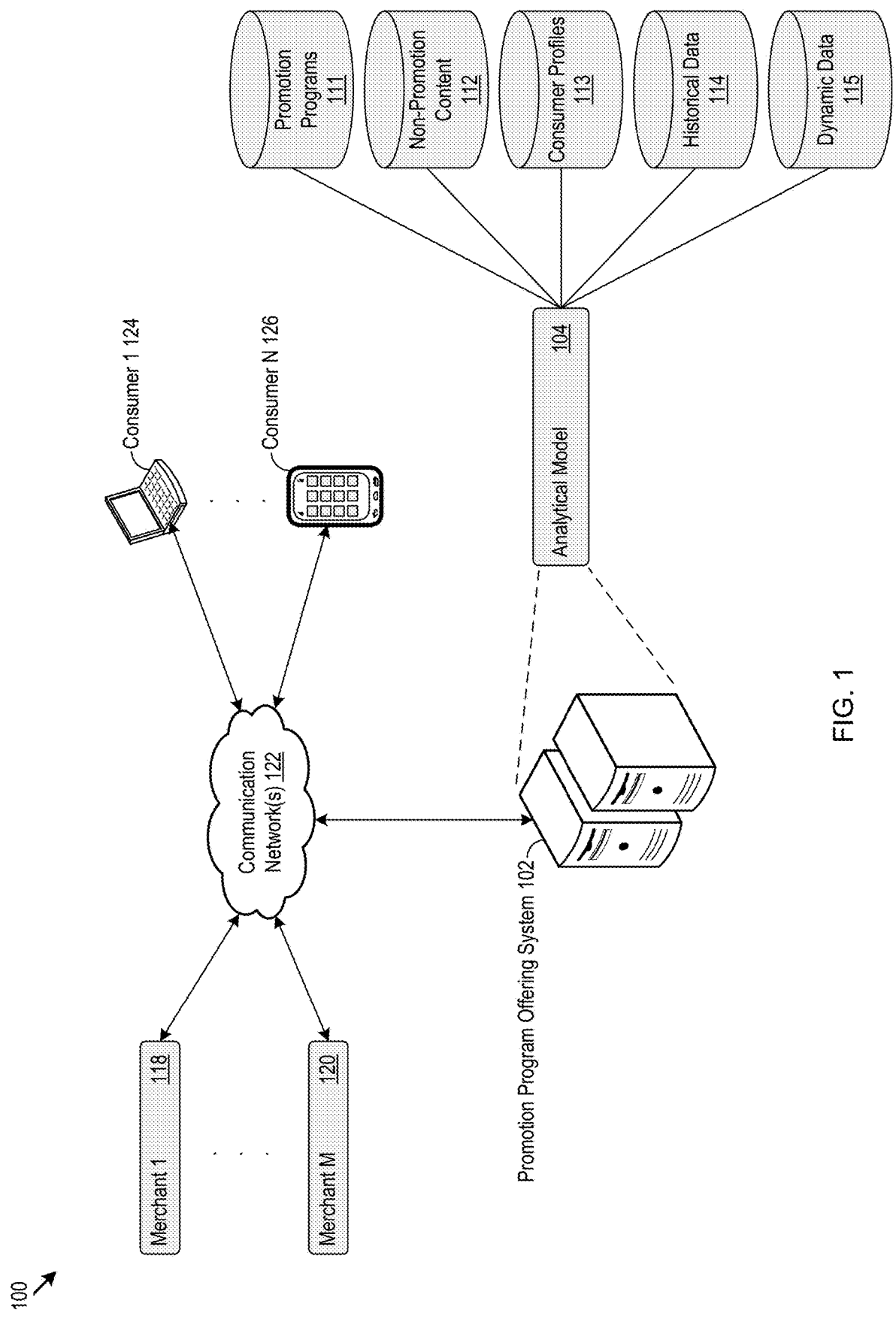
FIG. 1 shows an example of a system for determining non-promotion content to include in an electronic promotion correspondence sent to one or more consumers.

FIG. 1 shows an example of a system 100 for determining non-promotion content to include in an electronic promotion correspondence sent to one or more consumers. The system 100 includes a promotion program offering system 102, which communicates via one or more networks 122 with one or more consumers, such as consumer 1 124, consumer N 126, and more. The promotion program offering system 102 may send promotions to a consumer through any means or communication channel accessible by the consumer. For example, the promotion program offering system 102 may communicate with consumers by sending electronic promotion correspondence directly to a consumer device, such as a laptop computer used by consumer 1 124, a mobile telephone used by consumer N 126, or any other electronic device that can receive electronic promotion correspondence. The promotion program offering system 102 may also send electronic promotion correspondence to a consumer through an e-mail account of the consumer or through any information access point accessible by the consumer, e.g., via a consumer device. The promotion program offering system 102 may communicate with one or more merchants, such as the merchants labeled in FIG. 1 as merchant 1 118 and merchant M 120.

The promotion program offering system 102 includes an analytical model 104 that is in communication with databases 111, 112, 113, 114, and 115. The analytical model 104 may include one or more components, logic, or circuitry for grouping a number of promotions. The analytical model 104 may further include one or more components, logic, or circuitry for generating electronic promotion correspondence that includes one or more promotions, non-promotion content, or both.

A promotion may include any type of reward, discount, coupon, credit, deal, voucher or the like used toward part or all of the purchase of a product or a service. The promotion may be offered as part of a larger promotion program, or the promotion may be offered as a stand-alone one time promotion. In an effort to better distinguish and identify the promotion, the promotion may include one or more attributes, such as the merchant offering the promotion (e.g., merchant 1 118, which may be identified as "XYZ coffee shop"), the redemption location of the promotion, the amount of the promotion, the category of the promotion (such as a restaurant promotion, a spa promotion, a travel promotion, a local promotion, etc.), the subcategory of the promotion (such as a sushi restaurant), or the like. A promotion may be characterized by a promotion score.

The analytical model 104 may determine a promotion score for a promotion, including a consumer-specific promotion score based on one or more attributes, historical data, or other characteristics of the consumer and/or the promotion. In one implementation, the promotion score of a promotion may be a probability indicator of the particular consumer accepting (e.g., purchasing) the promotion. The analytical model 104 may determine or adjust a promotion score of a particular promotion to account for the effect of non-promotion content, e.g. when included together in an electronic promotion correspondence.

To generate promotion scores, the analytical model 104 may access data with respect to a particular consumer, a particular promotion, or both. The analytical model 104 may communicate with multiple databases of the promotion program offering system 102 such as a promotion program database 110, consumer profiles database 112, historical data database 114 and dynamic data database 116. With respect to the particular consumer, the analytical model 104 may access any of the databases 111-115 to obtain specific attribute information of the particular consumer and the various promotions and/or non-promotion content being scored. Various attributes may be associated or assigned to a promotion, non-promotion content, and a consumer in the promotion system 100. The analytical model 104 may use obtained attribute information to generate promotion scores for each promotion. An example of scoring promotions is disclosed in U.S. application Ser. No. 13/411,502, titled "Relevance System for Consumer Deals" and filed Mar. 2, 2012, incorporated above by reference herein in its entirety, incorporated by reference herein in its entirety. An example for scoring a grouping of promotions is disclosed in U.S. application Ser. No. 13/838,415, titled "Promotion Offering System Analyzing Collections Of Promotions," and filed on Mar. 15, 2013, the contents of which are incorporated by reference herein in their entirety. The analytical model 104 may implement any of the systems and perform any of the methods or techniques described in the above-incorporated references or in any reference incorporated herein.

Non-promotion content may refer to any content not part of a promotion. Non-promotion content may accompany promotion content presented to a consumer by the promotion program offering system 102, such as through electronic promotion correspondence (e.g., an e-mail, text message, or other forms), through a promotion website, or through other promotion presentation avenues. Non-promotion content may take any number of forms and include, as examples, a news article, informative article, images, logos, banners, background coloring, photographs, text, or any other indicia or content that is not part of a promotion. The analytical model 104 may categorize non-promotion content according to any number of characteristics of the non-promotion content. In that regard, The analytical model 104 may assign one or more attributes to non-promotion content, including attributes identifying the type of non-promotion content (e.g., logo, article, banner, etc.), location associated with the non-promotion content (e.g., a geographical location or location range, such as the location of an concert highlighted in a non-promotion content article), subject attributes according any degree of specificity (e.g., an article about sushi may be assigned attribute values of "restaurant" "food," "sushi", or any combination thereof or with other attribute values), a time attribute (e.g., time range when non-promotion content is active or available, date non-promotion content was generated, time when non-promotion content becomes inactive or decreases in relevance, etc.)

The analytical model 104 may additionally or alternatively categorize non-promotion content according to its potential effect on an electronic promotion correspondence. For example, the analytical model 104 may assign a particular replacement attribute value for non-promotion content that could potentially displace or replace one or more promotions in an electronic promotion correspondence, e.g., by replacing a promotion in an allocated portion (e.g., slot) of the electronic promotion correspondence or through insertion into the particular allocated portion and pushing down one or more promotions into a lower position in an e-mail, for example.

The analytical model 104 may assign, configure, or implement any non-promotion content attributes to describe or categorize non-promotion content. Examples of non-promotion content are presented in FIG. 3 and discussed in greater detail below.

The analytical model 104 may assess the impact of non-promotion content on a promotion or an electronic promotion correspondence. In some implementations, the analytical model 104 determines a similarity score for non-promotion content based on any combination of one or more consumer attributes, non-promotion attributes, attributes of one or more promotions, past engagement level of a consumer, performance data of the non-promotion content or similar non-promotion content, or other factors. In some implementations, the similarity score of non-promotion content is a probability indicator of the particular consumer accepting (e.g., purchasing) one or more promotions in an electronic promotion correspondence that includes the non-promotion content.

Turning to the databases 111-115, the promotion programs database 111 may store data detailing various promotions and promotion programs available for offer in the promotion program offering system 102. In order to input promotion program information into the promotions program database 110, merchants (e.g., merchant 1 118) may communicate through the communication networks 122 with the promotion program offering system 102 to input the information detailing the various promotion program offerings.

The non-promotion content database 112 may store any non-promotion content data. The promotion program offering system 102 may obtain non-promotion content from various sources. An operator of the promotion program offering system 102 may load non-promotion content into the non-promotion content database 112.

The consumer profiles database 113 may store consumer profiles for consumers, such as consumer 1 124 and consumer N 126. A consumer profile stored in consumer profiles database 113 may indicate any attributes or data with respect to the consumer, including, for instance, the name, age, gender, addresses (e.g., home, work, addresses of interest), occupation, educational background, previously accepted promotion program offerings, previously rejected promotion program offerings, and the like. The analytical model 104 may use one, some, or all of the attributes of the consumer in managing the electronic correspondence cadence of the consumer and/or determining whether to send an electronic promotion correspondence to the consumer.

The historical data database 114 may store data of previously offered promotion programs, such as performance detailing the past performance of promotion program offerings presented by the promotion program system 102. The historical data database 114 may include, as examples, rates of acceptances of specific promotion programs, attributes of consumers that accepted or rejected specific promotion programs, particular non-promotion content that was included when specific promotions are accepted or rejected, and the like. The historical data database 114 may also store past performance for non-promotion content as well, such as a click rate of non-promotion content, viewed rate, or any other statistics with regard to how consumers engage or interact with non-promotion content.

The dynamic data database 115 may store data of presently active promotion programs, such as performance data of a promotion program offering that is currently active in the promotion offering system 102. While a promotion program referenced in the dynamic data database 116 is currently active, the data stored in the dynamic data database 116 may pertain to performance data of the active promotion program from a previous time period.

FIG. 1 illustrates one exemplary database implementation of separate databases 111-115. It is contemplated to have the databases 111-115 arranged in any combination of one or more memories/storage units.

In operation and described in greater detail below, the promotion program offering system 102, through the analytical model 104, determines non-promotion content to include in an electronic promotion correspondence.

Figure 2:
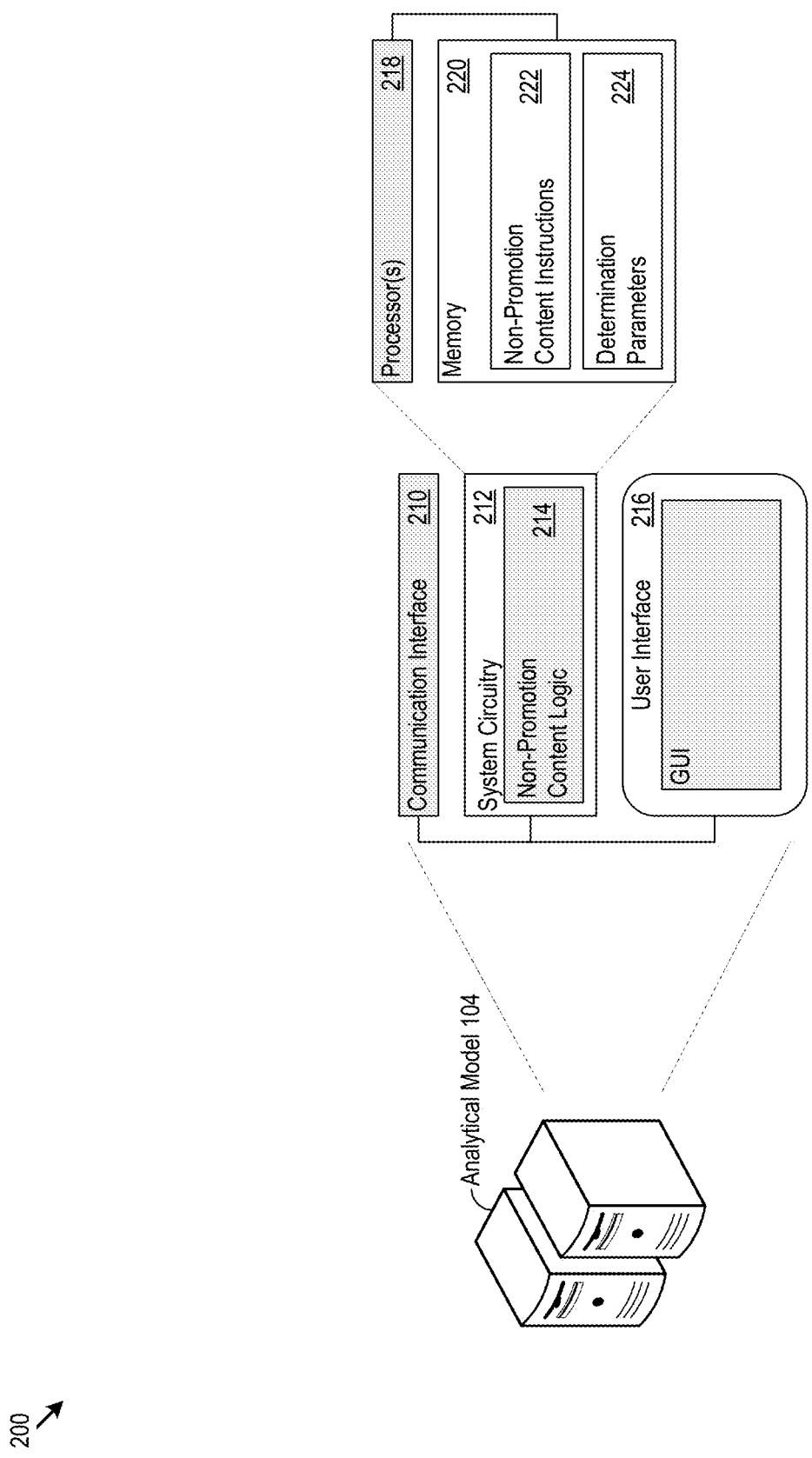
FIG. 2 shows an example implementation of the analytical model.

FIG. 2 shows an example system 200 for determining non-promotion content to include in an electronic promotion correspondence. The system 200 includes the analytical model 104. The analytical model 104 may include a communication interface 210, system circuitry 212, and a user interface 216. The system circuitry 212 of the analytical model 104 includes non-promotion content logic 214 and may perform any functionality associated with the analytical model 204, including any combination of the non-promotion content determination processes described herein. In one implementation, the system circuitry 212 includes one or more processors 216 and a memory 220. The memory 220 may store non-promotion content instructions 222 and determination parameters 224.

In operation, the non-promotion content logic 214 determines non-promotion content to present with one or more promotions according to the determination parameters 224. The following examples focus on determining non-promotion content to include when sending an electronic promotion correspondence with one or more promotions to a consumer. However, the non-promotion content logic 214 may consistently perform the methods and processes described herein to determine non-promotion content to include when presenting one or more promotions to a consumer according to any content presentation method, way, or process.

To determine non-promotion content to include with an electronic promotion correspondence, the non-promotion content logic 214 may, for example, select non-promotion content that shares one or more attributes with a promotion included in an electronic promotion correspondence, including attributes such as a location attribute, type attribute characterizing a promotion or non-promotion content (e.g., restaurants, food, sports, etc.), and more. The non-promotion content logic 214 may determine the effect of including non-promotion content on the promotion score of one or more promotions, e.g., by calculating and applying an adjustment factor to a promotion score of one or more promotions that may be included in an electronic promotion correspondence. The non-promotion content logic 214 may select particular non-promotion content to include in the electronic promotion correspondence based on feedback data obtained for the particular non-promotion content or for other non-promotion content sharing one or more common attributes with the particular non-promotion content. The non-promotion content logic 214 may perform any number of analyses or consider various data when determining non-promotion content to include when presenting promotions to a consumer.

Figure 3:
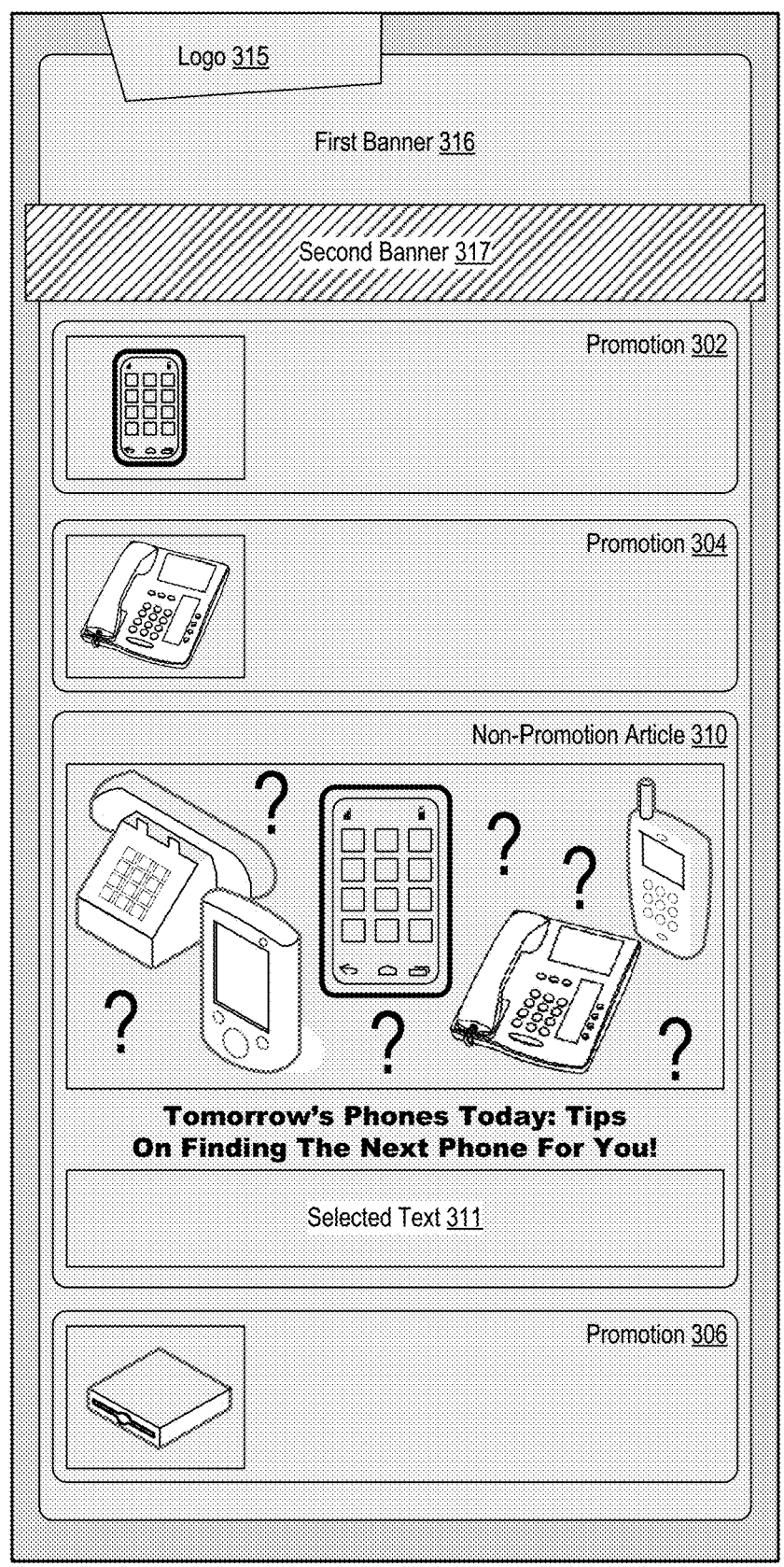
FIG. 3 shows an example of an electronic promotion correspondence that includes non-promotion content.

FIG. 3 shows an example of an electronic promotion correspondence 300 that includes non-promotion content. In FIG. 3, the exemplary electronic promotion correspondence 300 is an e-mail sent to a consumer or subscriber of the promotion program offering system 102, however any form of electronic promotion correspondence is contemplated, e.g., via a text message, a Short Message Service (SMS) message, a push notification presented through a user interface of a consumer device, or any other electronic correspondences a consumer may receive. The electronic promotion correspondence 300 includes promotion content, including the promotions labeled as promotion 302, promotion 304, and promotion 306. Promotion content may include a promotion image, the terms or other descriptive text specifically for the promotion, a web link for accessing the promotion (e.g., at a website maintained by the promotion program offering system 102), or any other content identifying a particular promotion.

The electronic promotion correspondence 300 includes non-promotion content. In particular, the electronic promotion correspondence 300 in FIG. 3 includes the non-promotion article 310, which may include, among other things, an article image, article title, and selected article text 311, e.g., the full text of the article or selected portion(s) of the article as determined by the analytical model 104. The electronic promotion correspondence 300 shown in FIG. 3 also includes the non-promotion content labeled as the logo 315, the first banner 316, and the second banner 317. The logo 315 may depict a company logo or other image, text, coloring, or other indicia associated with a sender of the electronic promotion correspondence 300. The first banner 316 and/or second banner 317 may include additional information, color, text, indicia, or other content as specified by the promotion program offering system 102.

As mentioned above, non-promotion content may include any content (e.g., of an electronic promotion correspondence) that is not promotion content. Some of the discussion and examples below focus on non-promotion content in an electronic promotion correspondence, however the analytical model 104 may determine non-promotion content for any form of presenting promotions to a consumer, such as non-promotion content in a promotion website operated by the promotion program offering system 102, in physical promotion correspondence (e.g., mail) sent to a consumer, and more.

While some non-limiting examples of non-promotion content in the electronic promotion correspondence 300 are provided in FIG. 3, non-promotion content may include various additional or alternative content or indicia as well. Non-promotion content may also include attributes or characteristics of a non-promotion portion of an electronic promotion correspondence or other promotion presentation channel, such as a background color, particular font for a logo or banner, or other attributes. As further examples, non-promotion content may include a color scheme applied to an electronic promotion correspondence, additional text or web links not part of a promotion, etc.

Figure 4:
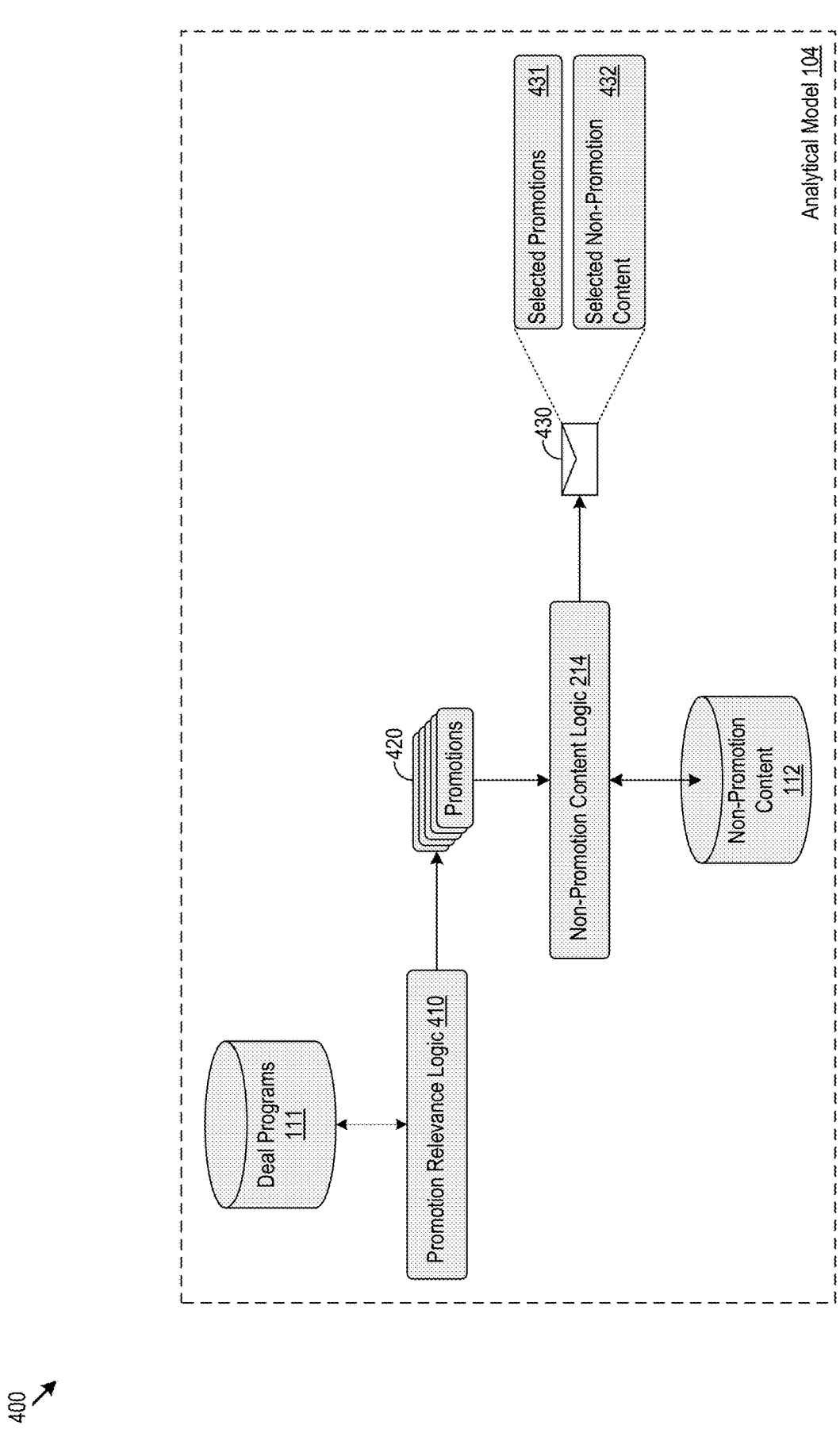
FIG. 4 shows an example of a data flow for determining non-promotion content to include in an electronic promotion correspondence.

FIG. 4 shows an example of a data flow 400 for determining non-promotion content to include in an electronic promotion correspondence. The data flow 400 illustrates one example of how the analytical model 104 may determine non-promotion content, if any, to include in an electronic promotion correspondence.

In the example shown in FIG. 4, the analytical model 104 includes promotion relevance logic 410. The promotion relevance logic 410 may access one or more promotions from the deal programs database 111 and score the promotions with respect to a particular consumer. A promotion score may represent, for example, a probability indicator of whether the particular consumer will purchase the promotion. Examples of promotion relevance logic 410 are described in U.S. application Ser. No. 13/411,502. The promotion relevance logic 410 may implement any of the methods, systems, and processes described in U.S. application Ser. No. 13/411,502 to score promotions for a particular consumer, including promotions specifically relevant to the particular consumer. The promotion relevance logic 410 may also generate or score collections or promotions, including by implementing any of the methods, systems, or processed described in U.S. application Ser. No. 13/838,415.

The promotion relevance logic 410 may determine a set of potential promotions 420 to send to a consumer. The set of potential promotions 420 may include any number of promotions from the deal programs database 111. The set of potential promotions 420 may include a predetermined number of individual or stand-alone promotions, one or more promotion collections, or both. For example, the promotion relevance logic 410 may determine the set of potential promotions 420 to include the 10 highest scoring promotions for a particular consumer and the 3 highest scoring collections for the particular consumer. In some implementations, the promotion relevance logic 410 may determine the set of potential promotions 420 to include all promotions and/or promotion collections with an associated score that exceeds a particular score threshold.

The set of potential promotions 420 may be greater (e.g., in number) than the number of promotions the analytical model 104 determines to include in an electronic promotion correspondence. For instance, the analytical model 104 may generate an electronic promotion correspondence for a consumer that includes positions (e.g., slots in a promotion e-mail) for a predetermined number of promotions, such as 16 promotions. In this example, the promotion relevance logic 410 may include more than 16 promotions in the set of potential promotions 420.

The non-promotion content logic 214 may access the set of potential promotions 420 for a consumer and determine non-promotion content to include in an electronic promotion correspondence. In that regard, the non-promotion content logic 214 may access potential non-promotion content from the non-promotion content database 112 and determine the effect of the potential non-promotion content on the potential promotions 420. The non-promotion content logic 214 may analyze some or all of available non-promotion content logic 214.

In some implementations, the non-promotion content 214 accesses a particular subset of all non-promotion content available to the non-promotion content logic 214. In that regard, the non-promotion content logic 214 may select non-promotion content according to any number of selection criteria, which may be specified in the determination parameters 224. For example, the non-promotion content logic 214 may determine a predetermined number of non-promotion content to consider and potentially include in the electronic promotion correspondence 430. The non-promotion content logic 214 may determine to consider non-promotion content sharing one or more common attributes with one or more promotions from the set of potential promotions 420. Along similar lines, the non-promotion content logic 214 may determine to consider non-promotion content with one or more particular attributes, e.g., of a particular location or location range, within a particular time range, that can potentially displace or replace a promotion in the electronic promotion correspondence 430, or more.

The non-promotion content logic 214 may determine selected promotion(s) 431 from among the set of potential promotions 420 and/or selected non-promotion content 432 from among potential non-promotion content to include in the electronic promotion correspondence 430. In doing so, the non-promotion content logic 214 may analyze the effect of any number of non-promotion content on the acceptance of the potential promotions and collections 420. Put another way, the non-promotion content logic 214 may determine the effect on the acceptance probability for one or more promotions when a particular piece of non-promotion content is included in an electronic promotion correspondence with the promotion. For example, the non-promotion content logic 214 may determine whether a first piece of non-promotion content increases the promotion acceptance (e.g., purchase) probability of a first promotion among the set of potential promotions 420. The non-promotion content logic 214 may also determine the degree to which presenting the non-promotion content with the first promotion may increase or decrease the promotion acceptance probability of the first promotion.

In some implementations, the non-promotion content logic 214 obtains feedback data indicative of how a particular non-promotion content or type of non-promotion content impacts a promotion or promotion type, including feedback data of multiple types. Some non-limiting examples of feedback data the non-promotion content logic 214 may obtain and utilize are presented next.

The feedback data may be past performance data of the particular non-promotion content, for example. The feedback data for particular non-promotion content may be indicative of how the particular non-promotion content has performed, e.g., in terms of number of clicks or other engagement measurements from user. Performance may be measured over a particular time period, such as shorter performance time periods (e.g., the past day or week) or over longer performance time periods (e.g., the past 2 months, etc.) The non-promotion content logic 214 may also obtain performance data indicative of how a particular non-promotion content performs when placed among varying promotions or sets of promotions, e.g., varying according to promotion attributes. As one example, the non-promotion content logic 214 may obtain feedback indicative of how a particular food-related non-promotion content affects promotion acceptance probability when placed among a first set of food-related promotions, among a second set of food-related promotions, and among a third set of non-food relate promotions. Any number of variations of feedback data according to promotion and/or consumer attributes are contemplated. The non-promotion content logic 214 may also obtain performance feedback data for non-promotion content and determine the performance (e.g., affect on promotion acceptance probability) based on when the non-promotion content is placed in different positions in an electronic promotion correspondence.

The non-promotion content logic 214 may obtain feedback data with respect to the particular consumer the electronic promotion correspondence 430 is targeted for and/or feedback data with respect to a group of consumers sharing one or more common consumer attributes with the particular consumer, including consumer attributes such as distance (e.g., other consumers within a particular distance of the particular consumer, the location of the non-promotion content, the location of one or more promotions, or any combination thereof), age or age range, gender, any aspect of past purchase history, explicitly or implicitly determined consumer purchase preferences, consumer engagement level, or any number of other consumer attributes. The non-promotion content logic 214 may also obtain feedback data for a non-promotion content across an entire population of consumers as well.

To obtain the feedback data, the non-promotion content logic 214 may access the historical data database 114, which stores performance data of past promotions and non-promotion content.

The non-promotion content logic 214 may gather feedback data to store in the historical data database 114 in any number of ways. For example, the non-promotion content logic 214 or any other portion of the analytical model 104 may implement any of the systems or logic and perform any of the methods and techniques described in U.S. patent application Ser. No. 13/756,145, titled "Pre-Feature Promotion System," filed on Jan. 31, 2013, the entirety of which is hereby incorporated by reference herein. For example, the non-promotion content logic 214 may gather empirical non-promotion performance data from a representative subset of consumers to initially determine.

In accessing and/or utilizing the feedback data, the non-promotion content logic 214 may consider feedback data across varying degrees of specificity with respect to non-deal content, promotions (or promotion collections), and for a particular consumer. With respect to non-deal content, the non-promotion content logic 214 may access feedback data for the particular non-promotion content, non-promotion content sharing one or more attributes, such as non-deal content sharing a common location or location range, of a particular type (e.g., logo non-deal content, articles, color schemes, etc.), related to a particular topic (e.g., food, restaurants, a specific type of food, etc.), size (e.g., length of text, size of an image, etc.), a common time range attribute, or any other attribute that can be associated with non-deal content. With respect to promotions, the non-promotion content logic 214 may access feedback data for a particular promotion from the set of potential promotions 420, for a particular promotion collection, for promotions or collections sharing a common promotion attribute, etc. With respect to the particular consumer, the non-promotion content logic 214 may access feedback data for the particular consumer or other consumers sharing common attributes with the particular consumer, as mentioned above. Thus, the non-promotion content logic 214 may flexibly consider feedback data with varying or configurable specificity, allowing a finer-grained or coarser-grained data analysis of the impact of non-promotion content on promotions with respect to a particular consumer the analytical model 104 is targeting the electronic promotion correspondence 430 for.

The non-promotion content logic 214 may account for the impact of including non-promotion content on the set of potential promotions 420. In some implementations, the non-promotion content logic 214 determines an adjustment factor for including a particular non-promotion content with a particular promotion. The adjustment factor may be indicative of the increase or decrease in acceptance probability of the promotion by including the particular non-promotion content. The non-promotion content logic 214 may determine an adjustment factor through analyzing the feedback data, including across any of the varying degrees of specificity described above. In that regard, the non-promotion content logic 214 may determine the difference in promotion acceptance rates with respect to any degree of the feedback data, and determine the adjustment factor as a function of the difference(s) in promotion acceptance rate.

In one example, the non-promotion content logic 214 determines the adjustment factor as a weighted average of the difference in promotion acceptance rate across various degrees of the feedback data. For example, the non-promotion content logic 214 may weight the past performance (e.g., difference in promotion acceptance rate) of the particular non-promotion content greater than the past performance of other non-promotion content sharing common attributes. In similar way, the non-promotion content logic 214 may assign varying weights according to other degrees of the feedback data, with respect to particular attributes (e.g., weighting feedback data of other consumers within a location range greater than feedback data of other consumers sharing a common age group), or both.

In addition to or as an alternative to promotion acceptance rate differences, the non-promotion content logic 214 may account for the engagement level with respect to non-promotion content. The non-promotion content logic 214 may measure non-promotion content engagement level as a whole for a consumer or group of consumers, e.g., the consumers' affinity, engagement, number of clicks, percentage of accesses, or any other engagement indicator for all types of non-promotion content. The non-promotion content logic 214 may determine or predict a consumer's general affinity for non-promotion content based on the consumer's past engagement/clicks on non-promotion content. The non-promotion content logic 214 may also account for how recently the consumer has been sent, viewed, or accessed non-promotion content, which may factor into the adjustment factor determination. The non-promotion content logic 124 may additionally or alternatively measure engagement level of a consumer (or group of consumers) for a particular type of non-promotion content, e.g., depending on attributes or characteristics of non-promotion content. For example, for non-promotion articles linked within an electronic promotion correspondence, the non-promotion content logic 214 may determine the rate at which a particular consumer or group of consumers (e.g., determined according to consumer attribute) accesses the article link for a particular non-promotion article, non-promotion articles of a particular subject, or any other grouping of non-promotion articles (e.g., determined according to any common characteristic across the promotion articles, such as articles about food, about a particular type of food, about restaurants, according to any other predetermined grouping criteria).

As another factor, the non-promotion content logic 214 may obtain feedback data relating to the consumer's purchase history, engagement level, or clicks for promotions or a particular type to assess or predict the consumer's affinity towards non-promotion content of the same or a similar type. For example, the non-promotion content logic 214 may determine a particular consumer has a higher affinity towards non-promotion content of a particular type or topic when the particular consumer (or similar group of consumers) has a high purchase rate or engagement level for promotions of the particular type.

The non-promotion content logic 214 may also account for non-promotion content related to, associated with, or sharing a common attribute with promotions relevant to the consumer. The non-promotion content logic 214 may measure relevance of promotions and non-promotion content through explicit consumer feedback (e.g., an explicit signal indicating the consumer is interested in a particular type of promotions) or implicit consumer feedback (e.g., types of promotions purchased by the consumer that exceed a certain interest threshold, which may be measured by number, percentage, or other metric including over a predetermined amount of time). The non-promotion content logic 214 may tune (e.g., increase or decrease) the adjustment factor based on any combination of the above-described factors.

In any of the ways discussed above, the non-promotion content logic 214 may determine a respective adjustment factor for the potential non-promotion content for some or all of the promotions of the potential set of promotions 420. In some implementations, the non-promotion content logic 214 determines a particular adjustment factor for specific consumer. In other implementations, the non-promotion content logic 214 determines an adjustment factor for a group of consumers, e.g., consumers sharing one or more common consumer attributes.

The non-promotion content logic 214 may apply the determined adjustment factor to the promotion score of a promotion with respect to a particular non-promotion content to obtain an adjusted promotion score. The adjusted promotion score may be indicative of the probability of a consumer purchasing the promotion when the particular non-promotion content is presented with the promotion. In that regard, the non-promotion logic 214 may iterate across any or all combinations of the potential non-promotion content and potential promotions and/or collections to determine the selected promotions 431 and selected non-promotion content 432 to include in the electronic promotion correspondence 430.

To determine the selected promotions 431 and the selected non-promotion content 432, the non-promotion content logic 214 may apply any number of determination criteria, which may be specified via the determination parameters 224. For example, the non-promotion content logic 214 may determine the selected promotions 431 and the selected non-promotion content 432 from among the set of potential promotions 420 and potential non-promotion content that results in the greatest probability of the consumer opening the electronic promotion correspondence 430, viewing one or more promotions in the electronic promotion correspondence 430, purchasing one or more promotions, or according to any other configurable criteria. In some implementations, the non-promotion content logic 214 can calculate a correspondence score for an promotion correspondence, which may be a function of one or more promotions scores of promotions in the electronic promotion correspondence (e.g., sum, weighted sum, average, weighted average, etc.). In these implementations, the non-promotion logic 214 may, for example, determine the selected promotions 431 and selected non-promotion content 432 that result in the highest correspondence score for the electronic promotion correspondence 430.

The exemplary data flow 400 shown in FIG. 4 illustrates one of many ways the analytical model 104 may generate an electronic promotion correspondence 430 targeted for a particular consumer, including determining selected promotions 431 and selected non-promotion content 432 to include in the electronic promotion correspondence 430. In some variations, the promotion relevance logic 410 and/or the non-promotion content logic 214 may determine the selected promotions 431 and selected non-promotion content 432 in parallel or as part of a single determination process. In other variations, the determination may be performed serially, e.g., determining the set of potential promotions 420 as a first step and then accessing and determining the effect of the non-promotion content 112 as a second step.

Figure 5:
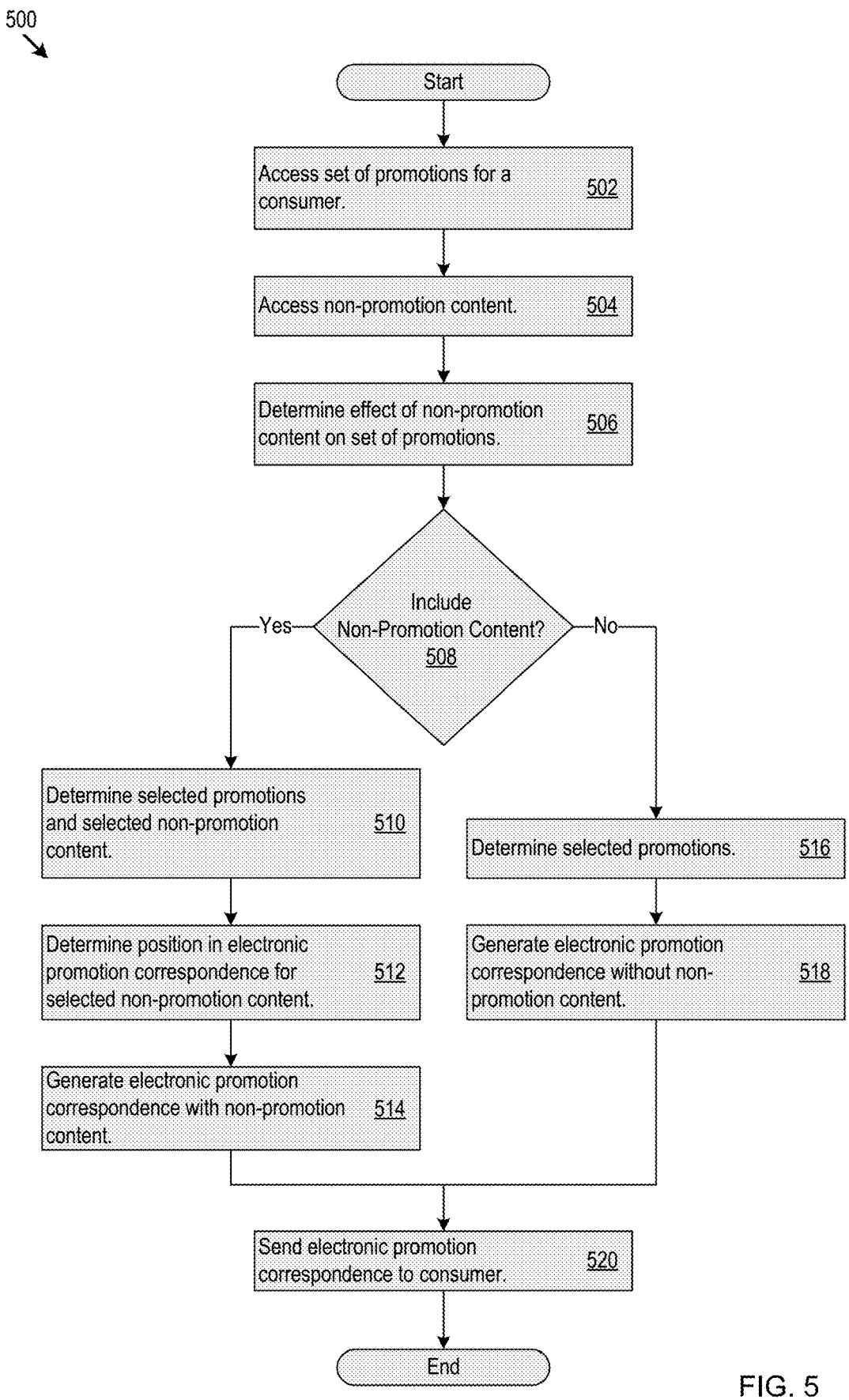
FIG. 5 shows an example of logic for determining non-promotion content to include in an electronic promotion correspondence.

FIG. 5 shows an example of logic 500 for determining non-promotion content to include in an electronic promotion correspondence. The logic 500 may be implemented in hardware, firmware, software, or any combination thereof. As one example, the analytical model 104 or the non-promotion content logic 214 may implement the logic 500 in software as the non-promotion content instructions 222. The non-promotion content logic 214 may perform the logic 500 to determine selected promotions 431 and selected non-promotion content 432 to include in an electronic promotion correspondence for a target consumer.

The non-promotion content logic 214 accesses a set of promotions for a target consumer (502) and non-promotion content (504). The set of promotions may be determined by the analytical model 104, e.g., by the promotion relevance logic 410, and may include a predetermined number of promotions and/or promotion collections with the greatest probability of purchase by the target consumer. Additionally or alternatively, the non-promotion content logic 214 may access promotions or promotion collections that share one or more common attributes with non-promotion content accessible to the non-promotion content logic 214. For example, a non-content promotion available to the non-promotion content logic 214 may be associated with a particular location or location range. In this example, the non-promotion content logic 214 may access other promotions in the particular location or location range, even when these other promotions are not within the predetermined number of promotions with the greatest purchase probability for the target consumer.

The non-promotion content logic 214 determines the effect of the accessed non-promotion content on set of promotions (506). The non-promotion content logic 214 may use any of the analysis techniques described above, such as accessing feedback data and determining an adjustment factor of a particular non-promotion content for a particular promotion or group of promotions. The non-promotion content logic 214 determines whether to include non-promotion content in an electronic promotion correspondence (508), such as by determining the whether including non-promotion content will result in the highest correspondence score of the electronic promotion correspondence among the various combinations from the accessed set of promotions and available non-promotion content.

If so, the non-promotion content logic 214 determines (e.g., identifies) the selected promotions 431 and selected non-promotion content 432 (510). In some implementations, the non-promotion content logic 214 determines a portion of the selected non-promotion content 432 to present to a consumer in the electronic promotion correspondence 430. To illustrate, the non-promotion content logic 214 may determine to include an article (e.g., the non-promotion article 310) whose length exceeds an allocated portion in the electronic promotion correspondence. In this case, the non-promotion content logic 214 may determine, for example, selected text from the article to present in the electronic promotion correspondence as well as a link (e.g., Uniform Resource Locator (URL) or web link) to the full article. The non-promotion content logic 214 may determine the selected text in accordance with any of the non-promotion content determination processes described herein, such as presenting the portion of the article that will increase the promotion purchase probability by the greatest amount, which may vary depending on consumer gender, age, location, etc.

The non-promotion content logic 214 may also determine a position in the electronic promotion correspondence 430 for selected non-promotion content 432 (512). In one variation, the non-promotion content logic 214 determines the position in the electronic promotion correspondence 430 that results in the highest promotion correspondence score. In that regard, the non-promotion content logic 214 may determine an adjustment factor for non-promotion content specific to the position of non-promotion content in past electronic promotion correspondence of accessed feedback data. When determining the effect of non-promotion content on the set of promotions, the non-promotion content logic 214 may thus account for the non-promotion correspondence positioning within an electronic promotion correspondence as an additional or alternative degree of analysis when determining the effect and/or adjustment factor. In a consistent manner, the non-promotion content logic 214 may determine respective positioning within the electronic promotion correspondence 430 for the selected promotions 431 as well. Upon determining the selected promotions 431, selected non-promotion content 432, and their respective positioning, the non-promotion content logic 430 generates the electronic promotion correspondence 430 (514).

The non-promotion content logic 214 may determine not to include non-promotion content, e.g., of a particular type such as a non-promotion article 310. This scenario may occur when including the non-promotion content would decrease the correspondence score of the electronic promotion correspondence (e.g., decrease the purchase probability of whether the target consumer will purchase one or more promotions included in the electronic promotion correspondence). In this case, the non-promotion content logic 214 determines selected promotions 431 to include, but foregoes including the non-promotion content (e.g., of a particular type). The non-promotion content logic 214 then generates the electronic promotion correspondence 430 without the particular non-promotion or non-promotion content type (518).

After generating the electronic promotion correspondence, the non-promotion content 214 sends the electronic promotion correspondence 430 to the target consumer.

Figure 6:
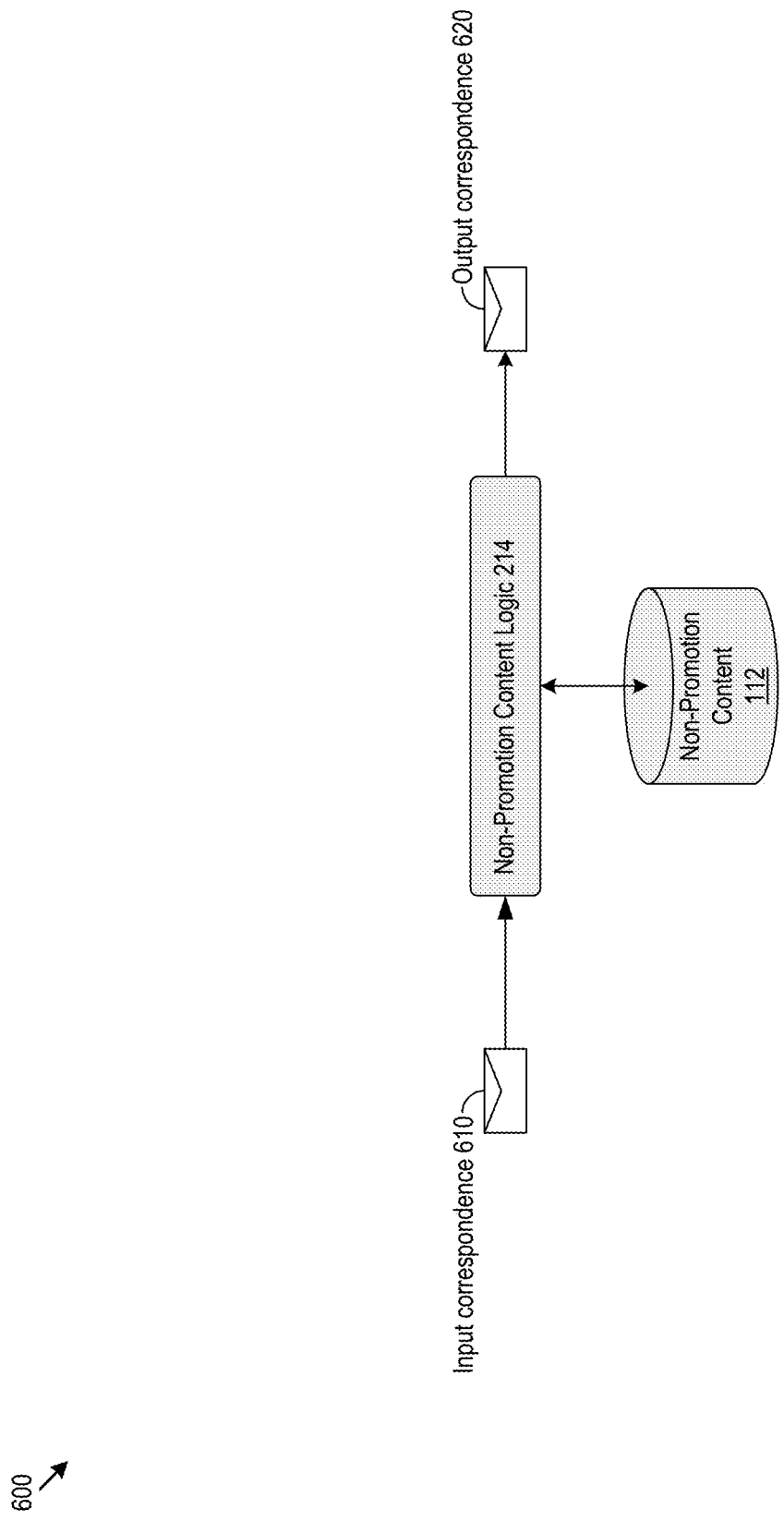
FIG. 6 shows an example of a data flow for determining non-promotion content to include in an electronic promotion correspondence.

FIG. 6 shows an example of a data flow 600 for determining non-promotion content to include in an electronic promotion correspondence. In this exemplary data flow 600, the non-promotion content logic 314 may receive an input electronic promotion correspondence 610. For example, other logic or circuitry in the analytical model 104 may generate the input electronic promotion correspondence 610, which may include a particular set of promotions, one or more promotion collections, or both, determined for a particular consumer.

In the example shown in FIG. 6, the non-promotion content logic 214 accesses available non-promotion content from the non-promotion content database 112 and determines the effect of including one or more non-promotion content in the input correspondence 610. The non-promotion content logic 214 may assess the impact of including non-promotion content in the input correspondence 610 in any of ways described above, such as by determining an adjustment factor based on feedback data with respect to an accessed non-promotion content and one or more promotions included in the input promotion correspondence 610. As similarly described above, the non-promotion content logic 214 may determine whether including non-promotion content will increase the correspondence score of the input electronic promotion correspondence 610.

In some implementations, the non-promotion content logic 214 may determine whether to replace one or more of the promotions in the input electronic promotion correspondence 610 with non-promotion content. In that regard, the non-promotion content logic 214 may determine a respective correspondence score according to any of the ways non-promotion content may be included into the input electronic promotion correspondence 610, including when replacing a first promotion in the input electronic promotion correspondence 610, when replacing a second promotion in the input electronic promotion correspondence 610, when inserted between a first and second promotion in the input electronic promotion correspondence 610 without replacing a promotion, etc. Accordingly, the non-promotion content logic 214 may consider any and all variations for including non-promotion content and determine whether to include non-promotion content and which particular non-promotion content to include, such as which variation results in the highest correspondence score.

The non-promotion content logic 214 generates an output electronic promotion correspondence 620. When the non-promotion content logic 214 determines to include non-promotion content, the output electronic promotion correspondence 620 includes the added non-promotion content (which may displace one or more promotions in the input electronic promotion correspondence 610). When the non-promotion content logic 214 determines not to include non-promotion content, the output electronic promotion correspondence 620 may be the same as the input electronic promotion correspondence 610.

In some implementations, the input electronic promotion correspondence 610 already includes non-promotion content. For example, the input electronic promotion correspondence 610 may include a logo, banners, color scheme, or default non-promotion content that may be preconfigured by the analytical model 104. In this case, the non-content promotion logic 214 may determine whether to adjust the predetermined non-promotion content, in similar ways as discussed above utilizing feedback data and determining a respective adjustment factor. The non-promotion content logic 214 may effectuate any adjustments to the already included non-promotion content in the output electronic promotion correspondence 620.

Figure 7:
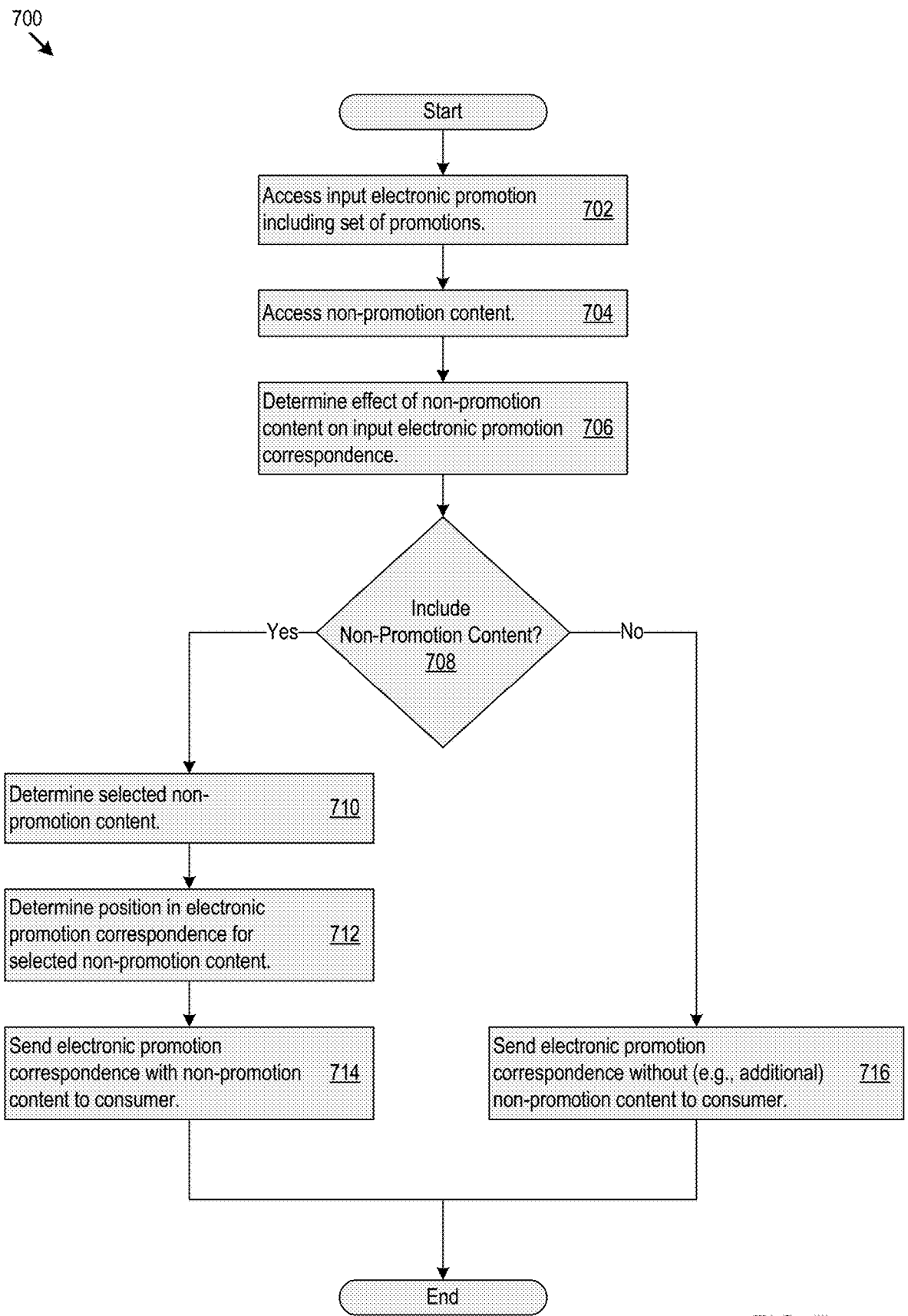
FIG. 7 shows an example of logic for determining non-promotion content to include in an electronic promotion correspondence.

FIG. 7 shows an example of logic 700 for determining non-promotion content to include in an electronic promotion correspondence. The logic 700 may be implemented in hardware, firmware, software, or any combination thereof. As one example, the analytical model 104 or the non-promotion content logic 214 may implement the logic 700 in software as the non-promotion content instructions 222. The non-promotion content logic 214 may perform the logic 700 to determine whether to alter an input electronic promotion correspondence 610 generated for a target consumer to include non-promotion content.

The non-promotion content logic 214 accesses an input electronic promotion correspondence 610 that includes one or more promotions for a target consumer (702). The non-promotion content logic 214 also accesses non-promotion content available to the promotion program offering system 102, e.g., via the non-promotion content database 112. The non-promotion content logic 214 then determines the effect of altering the input electronic promotion correspondence 610 to include one or more of the accessed non-promotion content (706).

The non-promotion content logic 214 may determine whether to include non-promotion content in the input electronic promotion correspondence 610 according to any number of determination criteria (708). As described above, the non-promotion content logic 214 may determine which configuration of non-promotion content and set (or subset) of promotions from the input electronic promotion correspondence 610 results in the greatest probability of the target consumer purchasing any promotion included in the electronic promotion correspondence, spending a threshold amount on promotions included in the electronic promotion correspondence, purchasing a particular promotion, or according to any other criteria. The non-promotion content logic 214 or analytical model 104 may configure and/or determine a correspondence score indicative of the particular determination criteria. In this way, the non-promotion content logic 214 may determine which configuration of non-promotion content and promotions results in the highest correspondence score.

When the non-promotion content logic 214 determines to alter the input electronic promotion correspondence 610 to include one or more non-promotion content, the non-promotion content logic 214 may determine the selected non-promotion content to include (710) and determine a position for the non-promotion content (712) in the electronic promotion correspondence. The non-promotion content logic 214 may also determine whether to displace (e.g., remove) one or more promotions in the input electronic promotion correspondence 610, such as when doing so will increase the correspondence score. Accordingly, the non-promotion content logic 214 may alter the input electronic promotion correspondence 610 to generate an output electronic promotion correspondence 620 that includes non-promotion content. The non-promotion content logic 214 may send the resulting output electronic promotion correspondence 620 to the target consumer (714). When the non-promotion content logic 214 determines not to alter the input electronic promotion correspondence 610 to include one or more accessed non-promotion content, the non-promotion content logic 214 sends the input electronic promotion correspondence 610 to the target consumer.

While the above discussion focused on determination methods and techniques with regard to non-promotion content, the analytical model 104 may apply consistent analysis and determinations for promotion content as well. The analytical model 104 may access any of the above-mentioned consumer or promotion feedback data to determine any aspect of electronic promotion correspondence sent to a particular consumer or group of consumers. The analytical model 104 may, as one example, determine whether to emphasize or de-emphasize a particular promotion, group of promotions, non-promotion content, and/or group of non-promotion content based on the accessed feedback data. Emphasis or de-emphasis may refer any visualization change in the electronic promotion correspondence, e.g., allocating a larger portion or space of the electronic promotion correspondence, allocating a different position in the electronic promotion correspondence, using a different font, font color, font size, bolding text, underling text, or varying any other text characteristic, varying an associated image with a promotion or non-promotion content, etc.

In some implementations, the analytical model 104 determines any changes to visual characteristics of the electronic promotion correspondence based on the promotion score of promotions to be included in the non-promotion content. The analytical model 104 may determine to emphasize a promotion according to any number of emphasis criteria, such as when the promotion score exceeds a particular score threshold, when the difference between the promotion score and the promotion of another promotion in the electronic promotion correspondence exceeds a difference threshold, when the correspondence score exceeds or falls below a correspondence threshold, or according to any number of other configurable or predetermined emphasis criteria. The analytical model 104 may make similar determinations for non-promotion content logic as well.

The present disclosure contemplates a computer-readable medium that includes instructions or receives and executes instructions responsive to a propagated signal, to implement one or more of the systems and methods described herein. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, may be constructed to implement one or more of the systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A system comprising at least one processor and at least one computer readable medium carrying a set of instructions that, when executed by the at least one processor, cause the system to:
   retrieve, using the at least one processor, a set of promotions and a set of non-promotion content, wherein each of the promotions of the set of promotions facilitates a purchase of a product or a service via respective electronic interfaces of respective client devices;
   select, using the at least one processor and based on respective attributes associated with respective consumer profiles stored in a consumer profiles database, a client device associated with a target consumer to receive an electronic promotion correspondence, wherein the electronic promotion correspondence is a push-type notification configured to allow feedback data to be collected from the client device associated with the target consumer;
   determine, using the at least one processor, an effect of presenting, in the electronic promotion correspondence for the target consumer, one or more non-promotion contents of the set of non-promotion content together with one or more promotions from among the set of promotions, the effect representative of a change in correspondence score for the electronic promotion correspondence and based on attributes associated with each non-promotion content of the one or more non-promotion contents, the attributes comprising one or more of a type of non-promotion content, a location associated with the non-promotion content, subject attributes associated with the non-promotion content, and a time attribute associated with the non-promotion content;
   determine, using the at least one processor, at least one selected promotion from among the set of promotions and at least one selected non-promotion content from among the set of non-promotion content to include in the electronic promotion correspondence to transmit to the client device associated with the target consumer;
   generate, using the at least one processor, the electronic promotion correspondence that includes the at least one selected promotion and the at least one selected non-promotion content;
   determine, using the at least one processor, whether to alter the electronic promotion correspondence to include a second non-promotion content of the set of non-promotion content based on dynamic rendering of the second non-promotion content; and
   when it is determined to alter the electronic promotion correspondence to include the second non-promotion content:
   configure the electronic promotion correspondence to include the second non-promotion content; and transmit the electronic promotion correspondence to the client device associated with the target consumer; and
when it is determined not to alter the electronic promotion correspondence to include the non-promotion content:
transmit the electronic promotion correspondence to the client device associated with the target consumer;
wherein determining whether to alter the electronic promotion correspondence to include the second non-promotion content based on the dynamic rendering of the second non-promotion content comprises:
determining a first correspondence score for the electronic promotion correspondence based on a first electronic interface configuration associated with simultaneous rendering of at least one promotion and the second non-promotion content via an electronic interface of the client device, the first correspondence score indicative of a probability of selection of an interactive interface element associated with at least one promotion included in the electronic promotion correspondence if the second non-promotion content is rendered at a first position on the electronic interface of the client device with respect to simultaneous rendering of the at least one promotion via the electronic interface of the client device, wherein the interactive interface element is configured to receive the feedback data associated with the electronic promotion correspondence, wherein the first correspondence score is based at least on a first plurality of promotion scores if the second non-promotion content is included at the first position in the electronic promotion correspondence, wherein each promotion score is generated for each promotion of the set of promotions included in the electronic promotion correspondence and specific to the target consumer, and wherein the first correspondence score is increased in response to the first position being positioned with respect to the at least one promotion in the electronic promotion correspondence;
determining a second correspondence score for the electronic promotion correspondence based on a second electronic interface configuration associated with simultaneous rendering of at least one promotion and the second non-promotion content via the electronic interface of the client device, the second correspondence score indicative of a probability of selection of the interactive interface element associated with the at least one promotion included in the electronic correspondence if the second non-promotion content is rendered at a second position on the electronic interface of the client device with respect to simultaneous rendering of the at least one promotion via the electronic interface of the client device, wherein the second correspondence score is based at least on a second plurality of promotion scores if the second non-promotion content is included at the second position in the electronic promotion correspondence, wherein each promotion score is generated for each promotion of the set of promotions included in the electronic promotion correspondence and specific to the target consumer, and wherein the second correspondence score is increased in response to the second position being positioned with respect to the at least one promotion in the electronic promotion correspondence;

in response to a first determination that the first correspondence score exceeds the second correspondence score,
allocating a first area of the electronic interface for the interactive interface element associated with the at least one promotion, comprising configuring the electronic promotion correspondence to provide the interactive interface element associated with the at least one promotion via the first area of the electronic interface of the client device,
allocating, based on the first correspondence score, a second area of the electronic interface that corresponds to the first position associated with the second non-promotion content, comprising configuring the electronic promotion correspondence to render the second non-promotion content at the first position on the electronic interface of the client device,
transmitting, to the client device, the electronic promotion correspondence via a communication channel associated with the push-type notification, and
receiving, from the client, the feedback data via the interactive interface element associated with the at least one promotion that is rendered via the electronic interface simultaneously with the second non-promotion content at the first position on the electronic interface; and
in response to a second determination that the second correspondence score exceeds the first correspondence score,
allocating a third area of the electronic interface for the interactive interface element associated with the at least one promotion, comprising configuring the electronic promotion correspondence to provide the interactive interface element associated with the at least one promotion via the third area of the electronic interface of the client device,
allocating, based on the second correspondence score, a fourth area of the electronic interface that corresponds to the second position associated with the second non-promotion content, comprising configuring the electronic promotion correspondence to render the second non-promotion content at the second position on the electronic interface of the client device,
transmitting, to the client device, the electronic promotion correspondence via the communication channel associated with the the push-type notification, and
receiving, from the client, the feedback data via the interactive interface element associated with the at least one promotion that is rendered via the electronic interface simultaneously with the second non-promotion content at the second position on the electronic interface.

2. The system of claim 1, wherein the at least one processor and at least one computer readable medium carrying a set of instructions that, when executed by the at least one processor, further cause the system to:
determine, using the at least one processor, the effect of presenting one or more of the non-promotion content with promotions from among the set of promotions by:
accessing a promotion score for each of the promotions from among the set of promotions, where the promotion score is indicative of a promotion purchase probability for a particular promotion by the target consumer;

determining first respective adjustment factors associated with a first non-promotion content of the set of non-promotion contents for each of the promotions among the set of promotions;

applying the first respective adjustment factors to the promotion score for each of the promotions to obtain first adjusted promotion scores; and determining the at least one selected promotion based on the first adjusted promotion scores.

3. The system of claim 2, wherein the at least one processor and at least one computer readable medium carrying a set of instructions that, when executed by the at least one processor, further cause the system to:

determine, using the at least one processor, the first respective adjustment factors associated with the first non-promotion content by determining an effect on promotion purchase probability caused by including the first non-promotion content in electronic promotion correspondences transmitted to client devices associated with other consumers sharing one or more common consumer attributes with the target consumer.

4. The system of claim 2, wherein the at least one processor and at least one computer readable medium carrying a set of instructions that, when executed by the at least one processor, further cause the system to:

determine, using the at least one processor, the first respective adjustment factors associated with the first non-promotion content by determining an effect on promotion purchase probability caused by including the other non-promotion content sharing one or more common attributes with the first non-promotion content in electronic promotion correspondences transmitted to the client device associated with the target consumer.

5. The system of claim 2, where determining first respective adjustment factors associated with the first non-promotion content for each of the promotions among the set of promotions comprises accounting for engagement level of other consumers sharing one or more common consumer attributes with the target consumer for previously sent electronic promotion correspondences including the first non-promotion content.

6. The system of claim 1, wherein at least one processor and at least one computer readable medium carrying a set of instructions that, when executed by the at least one processor, further cause the system to:

determine, using the at least one processor, a third position in the electronic promotion correspondence to present at least one selected non-promotion content.

7. The system of claim 1, wherein at least one processor and at least one computer readable medium carrying a set of instructions that, when executed by the at least one processor, further cause the system to:

forego determining a selected non-promotion content when none of the non-promotion content from among the set of non-promotion content affects a first promotion from among the set of promotions by increasing the promotion purchase probability of the first promotion.

8. The system of claim 1, wherein at least one processor and at least one computer readable medium carrying a set of instructions that, when executed by the at least one processor, further cause the system to:

determine, using at least one processor, the effect of presenting each of the non-promotion content with each promotion from among the set of promotions; and determine the at least one selected promotion and the at least one selected non-promotion content to include in the electronic promotion correspondence according to a determination criterion.

9. The system of claim 7, where the determination criterion specifies determining the at least one selected promotion and the at least one selected non-promotion content that results in results in the greatest probability of the target consumer purchasing any selected promotion included in the electronic promotion correspondence, spending a threshold amount on selected promotions included in the electronic promotion correspondence, purchasing a particular selected promotion, or any combination thereof.

10. A computer-implemented method comprising:

retrieving, by a processor and based on respective attributes associated with respective consumer profiles stored in a consumer profiles database, an input electronic promotion correspondence for a client device associated with a target consumer, where the input electronic promotion correspondence comprises one or more promotions and a first non-promotion content, and wherein the input electronic promotion correspondence is a push-type notification configured to allow feedback data to be collected from the client device associated with the target consumer;

determining, by the processor, whether to alter the input electronic promotion correspondence to include a second non-promotion content of the set of non-promotion content based on an effect representative of a change in correspondence score for the input electronic promotion correspondence if the second non-promotion content is included in the input electronic promotion correspondence, the effect based on attributes associated with the second non-promotion content, the attributes comprising one or more of a type of the second non-promotion content, a location associated with the second non-promotion content, subject attributes associated with the second non-promotion content, and a time attribute associated with the second non-promotion content; and when it is determined to alter the input electronic promotion correspondence to include the second non-promotion content:

configuring, by the processor, the electronic promotion correspondence to include the second non-promotion content; and transmitting, by the processor, the electronic promotion correspondence to a client device associated with the target consumer; and wherein determining whether to alter the input electronic promotion correspondence to include the second non-promotion content comprises:

determining a first correspondence score for the electronic promotion correspondence based on a first electronic interface configuration associated with simultaneous rendering of at least one promotion and the second non-promotion content via an electronic interface of the client device, the first correspondence score indicative of a probability of selection of an interactive interface element associated with at least one promotion included in the electronic promotion correspondence if the second non-promotion content is rendered at a first position on the electronic interface of the client device with respect to simultaneous rendering of the at least one promotion via the electronic interface of the client device, wherein the interactive interface element is configured to receive the feedback data associated with the electronic promotion correspondence, wherein the first correspondence score is based at least on a first plurality of promotion scores if the second non-promotion content is included at the first position in the electronic promotion correspondence, wherein each promotion score is generated for each promotion of the set of promotions included in the electronic promotion correspondence and specific to the target consumer, and wherein the first correspondence score is increased in response to the first position being positioned with respect to the at least one promotion in the electronic promotion correspondence;

determining a second correspondence score for the electronic promotion correspondence based on a second electronic interface configuration associated with simultaneous rendering of at least one promotion and the second non-promotion content via the electronic interface of the client device, the second correspondence score indicative of a probability of selection of the interactive interface element associated with the at least one promotion if the second non-promotion content is rendered at a second position on the electronic interface of the client device with respect to simultaneous rendering of the at least one promotion via the electronic interface of the client device, wherein the second correspondence score is based at least on a second plurality of promotion scores if the second non-promotion content is included at the second position in the electronic promotion correspondence, wherein each promotion score generated for each promotion of the set of promotions included in the electronic promotion correspondence and specific to the target consumer, and wherein the second correspondence score is increased in response to the second position being positioned with respect to the at least one promotion in the electronic promotion correspondence;

in response to a first determination that the first correspondence score exceeds the second correspondence score,
    allocating a first area of the electronic interface for the interactive interface element associated with the at least one promotion, comprising configuring the electronic promotion correspondence to provide the interactive interface element associated with the at least one promotion via the first area of the electronic interface of the client device,
    allocating, based on the first correspondence score, a second area of the electronic interface that corresponds to the first position associated with the second non-promotion content, comprising configuring the electronic promotion correspondence to render the second non-promotion content at the first position on the electronic interface of the client device,
    transmitting, to the client device, the electronic promotion correspondence via a communication channel associated with the push-type notification, and
    receiving, from the client, the feedback data via the interactive interface element associated with the at least one promotion that is rendered via the electronic interface simultaneously with the second non-promotion content at the first position on the electronic interface; and in response to a second determination that the second correspondence score exceeds the first correspondence score,
    allocating a third area of the electronic interface for the interactive interface element associated with the at least one promotion, comprising configuring the electronic promotion correspondence to provide the interactive interface element associated with the at least one promotion via the third area of the electronic interface of the client device,
    allocating, based on the second correspondence score, a fourth area of the electronic interface that corresponds to the second position associated with the second non-promotion content, comprising configuring the electronic promotion correspondence to render the second non-promotion content at the second position on the electronic interface of the client device,
    transmitting, to the client device, the electronic promotion correspondence via the communication channel associated with the push-type notification, and
    receiving, from the client, the feedback data via the interactive interface element associated with the at least one promotion that is rendered via the electronic interface simultaneously with the second non-promotion content at the second position on the electronic interface.

11. The method of claim 10, where determining whether to alter the input electronic promotion correspondence to include the non-promotion content comprises:
    comparing, by the processor, the first correspondence score with the second correspondence score.

12. A computer-implemented method comprising:
    retrieving, by a processor, a set of promotions, where the set of promotions includes a first promotion, wherein each of the promotions of the set of promotions facilitates a purchase of a product or a service via respective electronic interfaces of respective client devices;
    retrieving, by the processor, a first non-promotion content from a set of non-promotion contents;
    selecting, by the processor and based on respective attributes associated with respective consumer profiles stored in a consumer profiles database, a client device associated with a target consumer to receive an electronic promotion correspondence, wherein the electronic promotion correspondence is a push-type notification configured to allow feedback data to be collected from the client device associated with the target consumer;
    determining, by the processor, an effect of presenting, in the electronic promotion correspondence for the target consumer, the first non-promotion content together with the first promotion in the electronic promotion correspondence for the consumer, the effect representative of a change in correspondence score for the electronic promotion correspondence and based on attributes associated with each non-promotion content of the one or more non-promotion contents, the attributes comprising one or more of a type of non-promotion content, a location associated with the non-promotion content, subject attributes associated with the non-promotion content, and a time attribute associated with the non-promotion content;

determining, by the processor, whether to include the first non-promotion content, the first promotion, or both, in the electronic promotion correspondence for the consumer based, at least in part, on the effect of presenting the first non-promotion content together with the first promotion in the electronic promotion correspondence;

determining, by the processor, whether to alter the electronic promotion correspondence to include a second non-promotion content of the set of non-promotion contents based on dynamic rendering of the second non-promotion content; and when it is determined to alter the electronic promotion correspondence to include the second non-promotion content:

configuring, by the processor, the electronic promotion correspondence to include the second non-promotion content; and transmitting, by the processor, the electronic promotion correspondence to the client device associated with the target consumer; and wherein determining whether to alter the electronic promotion correspondence to include the second non-promotion content comprises:

determining, by the processor, a first correspondence score for the electronic promotion correspondence based on a first electronic interface configuration associated with simultaneous rendering of at least one promotion and the second non-promotion content via an electronic interface of the client device, the first correspondence score indicative of a probability of selection of an interactive interface element associated with at least one promotion included in the electronic promotion correspondence if the second non-promotion content is rendered at a first position on the electronic interface of the client device with respect to simultaneous rendering of the at least one promotion via the electronic interface of the client device, wherein the interactive interface element is configured to receive the feedback data associated with the electronic promotion correspondence, wherein the first correspondence score is based at least on a first plurality of promotion scores if the second non-promotion content is included at the first position in the electronic promotion correspondence, wherein each promotion score is generated for each promotion of the set of promotions included in the electronic promotion correspondence and specific to the target consumer, and wherein the first correspondence score is increased in response to the first position being positioned with respect to the at least one promotion in the electronic promotion correspondence;

determining, by the processor, a second correspondence score for the electronic correspondence based on a second electronic interface configuration associated with simultaneous rendering of at least one promotion and the second non-promotion content via the electronic interface of the client device, the second correspondence score indicative of a probability of selection of the interactive interface element associated with the at least one promotion included in the electronic correspondence if the second non-promotion content is rendered at a second position on the electronic interface of the client device with respect to simultaneous rendering of the at least one promotion via the electronic interface of the client device, wherein the second correspondence score is based at least on a second plurality of promotion scores if the second non-promotion content is included at the second position in the electronic promotion correspondence, wherein each promotion score is generated for each promotion of the set of promotions included in the electronic promotion correspondence and specific to the target consumer, and wherein the second correspondence score is increased in response to the second position being positioned with respect to the at least one promotion in the electronic promotion correspondence;

in response to a first determination that the first correspondence score exceeds the second correspondence score, allocating, by the processor, a first area of the electronic interface for the interactive interface element associated with the at least one promotion, comprising configuring, by the processor, the electronic promotion correspondence to provide the interactive interface element associated with the at least one promotion via the first area of the electronic interface of the client device, allocating, by the processor and based on the first correspondence score, a second area of the electronic interface that corresponds to the first position associated with the second non-promotion content, comprising configuring, by the processor, the electronic promotion correspondence to render the second non-promotion content at the first position on the electronic interface of the client device, transmitting, by the processor and to the client device, the electronic promotion correspondence via a communication channel associated with the push notification-type, and receiving, by the processor and from the client, the feedback data via the interactive interface element associated with the at least one promotion that is rendered via the electronic interface simultaneously with the second non-promotion content at the first position on the electronic interface; and in response to a second determination that the second correspondence score exceeds the first correspondence score, allocating, by the processor, a third area of the electronic interface for the interactive interface element associated with the at least one promotion, comprising configuring, by the processor, the electronic promotion correspondence to provide the interactive interface element associated with the at least one promotion via the third area of the electronic interface of the client device, allocating, by the processor and based on the second correspondence score, a fourth area of the electronic interface that corresponds to the second position associated with the second non-promotion content, comprising configuring, by the processor, the electronic promotion correspondence to render the second non-promotion content at the second position on the electronic interface of the client device, transmitting, by the processor and to the client device, the electronic promotion correspondence via the communication channel associated with the push-type notification, and receiving, from the client, the feedback data via the interactive interface element associated with the at least one promotion that is rendered via the electronic interface simultaneously with the second non-promotion content at the second position on the electronic interface.

13. The method of claim 12, where determining the effect of presenting the first non-promotion content with the first promotion comprises determining, by the processor, whether presenting the first non-promotion content with the first promotion in an electronic promotion correspondence results in a highest correspondence score of the electronic promotion correspondence among the various combinations from the accessed set of promotions and available non-promotion content.

14. The method of claim 13, where determining the effect of presenting the first non-promotion content with the first promotion further comprises determining, by the processor, a degree to which the probability the consumer purchases the first promotion increases or decreases.

15. The method of claim 12, further comprising:
accessing, by the processor, feedback data for the first non-promotion content, where the feedback data comprises a first promotion purchase rate for electronic promotion correspondences sent to the consumer including the first non-promotion content and a second promotion purchase rate for electronic promotion correspondences sent to the consumer not including the first non-promotion content; and
determining, by the processor, the effect of presenting the first non-promotion content with the first promotion based on the feedback data by comparing the first promotion purchase rate and the second promotion purchase rate.

16. The method of claim 12, further comprising:
accessing, by the processor, feedback data indicative of a first promotion purchase rate for electronic promotion correspondences including the first non-promotion content sent to other consumers sharing one or more common consumer attributes with the consumer and a second promotion purchase rate for electronic promotion correspondences not including the first non-promotion content sent to the other consumers; and
determining, by the processor, the effect of presenting the first non-promotion content with the first promotion based on the feedback data by comparing the first promotion purchase rate and the second promotion purchase rate.

17. The method of claim 12, further comprising:
accessing, by the processor, feedback data indicative of a first promotion purchase rate for electronic promotion correspondences including other non-promotion content sharing one or more common characteristics with the first non-promotion content and a second promotion purchase rate for electronic promotion correspondences not including the other non-promotion content; and
determining, by the processor, the effect of presenting the first non-promotion content with the first promotion based on the feedback data by comparing the first promotion purchase rate and the second promotion purchase rate.

\* \* \* \* \*